United States Patent [19]

Creyf

[11] 4,334,944
[45] Jun. 15, 1982

[54] METHOD OF PREPARING POLYUREA FOAM MATERIALS

[75] Inventor: Hubert S. Creyf, Brugge, Belgium

[73] Assignee: PRB N.V., Brussels, Belgium

[21] Appl. No.: 36,452

[22] Filed: May 7, 1979

[30] Foreign Application Priority Data

May 8, 1978 [NL] Netherlands .................. 7804908

[51] Int. Cl.³ .................. B29D 27/04; B32B 5/18
[52] U.S. Cl. .................. 156/308.2; 264/54; 264/145; 264/321; 264/DIG. 4; 521/106; 521/129; 521/164
[58] Field of Search .................. 264/54, 51, 146, 145, 264/DIG. 4, 321; 521/106, 129, 164; 156/78, 308.2; 428/315

[56] References Cited

U.S. PATENT DOCUMENTS

| | | | |
|---|---|---|---|
| 2,838,801 | 6/1958 | De Long et al. | 264/145 X |
| 2,841,205 | 7/1958 | Bird | 264/146 X |
| 3,006,033 | 10/1961 | Knox | 264/54 X |
| 3,012,283 | 12/1961 | Foster | 264/54 |
| 3,056,168 | 10/1962 | Terry | 264/54 X |
| 3,062,698 | 11/1962 | Aykanian | 156/308.2 |
| 3,131,426 | 5/1964 | Legler | 264/54 X |
| 3,249,661 | 5/1966 | Willy | 264/54 |
| 3,269,882 | 8/1966 | Willy | 264/54 X |
| 3,291,873 | 12/1966 | Eakin | 264/54 |
| 3,354,503 | 11/1967 | Joseph et al. | 264/54 X |
| 3,443,007 | 5/1969 | Hardy | 264/54 X |
| 3,497,416 | 2/1970 | Critchfield et al. | 156/308.2 X |
| 3,547,753 | 12/1970 | Sutton | 156/308.2 X |
| 3,553,300 | 1/1971 | Buff | 264/54 X |
| 3,887,502 | 6/1975 | Adams | 521/129 |
| 3,931,450 | 1/1976 | Patton et al. | 156/308.2 X |
| 3,966,521 | 6/1976 | Patton et al. | 156/308.2 X |
| 3,986,991 | 10/1976 | Kolakowski et al. | 521/129 X |
| 4,014,967 | 3/1977 | Hattenberger et al. | 264/51 |
| 4,048,106 | 9/1977 | Hermans | 521/129 |
| 4,052,345 | 10/1977 | Austin et al. | 521/129 |
| 4,088,722 | 5/1978 | Marjoram | 264/51 X |
| 4,104,346 | 8/1978 | Curtiss et al. | 264/51 |
| 4,105,594 | 8/1978 | Dieterich et al. | 521/106 X |
| 4,129,693 | 12/1978 | Cenker et al. | 521/129 X |

FOREIGN PATENT DOCUMENTS

| | | | |
|---|---|---|---|
| 209977 | 8/1957 | Australia | 156/308.2 |
| 2424322 | 11/1975 | Fed. Rep. of Germany | 264/146 |
| 2613964 | 10/1977 | Fed. Rep. of Germany | 156/308.2 |
| 803466 | 10/1936 | France | 264/146 |
| 1158057 | 11/1955 | France | . |
| 50-6863 | 3/1975 | Japan | 264/145 |
| 992373 | 10/1962 | United Kingdom | . |
| 1214306 | 12/1970 | United Kingdom | 156/308.2 |

OTHER PUBLICATIONS

Payne, Henry Fleming, "Organic Coating Technology, vol. 1: Oils, Resins, Varnishes, and Polymers", New York, John Wiley & Sons, ©1965, pp. 378-401.

Primary Examiner—Philip Anderson
Attorney, Agent, or Firm—Buell, Blenko, Ziesenheim & Beck

[57] ABSTRACT

The present invention provides a method to improve the rupture stability of polyurea foam materials to such a level that they can be applied on a commercial scale. This is achieved by incorporating 0.5 to 50 parts by weight of at least one alkanolamine having at least one amino group, one hydroxyl group and a molecular weight of from 47 to 2000 per 100 parts by weight of polyisocyanate used for the preparation of said polyurea foam materials. Preferably the foam material prepared is cut into pieces by cutting it in the rise direction, more particularly in the rise direction that is perpendicular to the machine direction of the foam, and subsequently crushing said pieces at least once.

31 Claims, 10 Drawing Figures fig-1 fig-2 WITH fig-3 WITHOUT fig-4 fig-5 fig-6 fig-7 fig-8 fig-9 fig-10

METHOD OF PREPARING POLYUREA FOAM MATERIALS

BRIEF SUMMARY OF THE INVENTION

The present invention relates to a method of preparing polyurea foam materials, comprising reacting at least one polyisocyanate with water in the presence of at least one catalyst and 0.5 to 50 parts by weight of at least one plasticiser per 100 parts by weight of polyisocyanate. The plasticizer is preferably an organic phosphate plasticizer such as tris (2,3-dichloropropyl) phosphate, tris (2,3-dibromo propyl) phosphate, tris (B chloroethyl) phosphate, tetrakis (2-chloroethyl) ethylenediphosphate or any similar plasticizer. Rupture stability of the foam is improved by adding to each 100 parts by weight of isocyanate about 0.5 to 50 parts by weight of at least one alkanolamine having at least one amino group, one hydroxyl group and a molecular weight from 47 to 2000. The foam is preferably cut into pieces in the rise direction, more particularly in the rise direction perpendicular to the machine direction of the foam and subsequently crushing said pieces at least once, preferably in a direction perpendicular to the rise direction.

Belgian Pat. specification No. 843,172 discloses such a method, wheein at lest one polyisocyanate is reacted with at least a chemically equivalent proportion of water, in the presence of 0.5 to 10 weight percent, calculated on the organic isocyanate, of at least one imidazole as a catalyst. In order to improve the rupture stability and fire resistance, preferably 10 to 200 weight percent, calculated on the polyisocyanate, of at least one plasticiser are incorporated in the reaction mixture. A further improvement of the stability of the foamed polymer may be achieved by incorporating in the reaction mixture, apart from thea bove components, still up to 30 weight percent of a polyol, calculated on the polyisocyanate. Notwithstanding said additions the rupture resistance of the polyurea foam materials obtained is still too poor to apply said materials on a commercial scale. Moreover the reaction profile of the foam reaction is not satisfying.

It was found, that a considerable improvement of the foam profile may be achieved by incorporating in the reaction mixture of a polyisocyanate, water, catalyst(s) and plasticiser(s), 0.5 to 50 parts by weight per 100 parts by weight of polyisocyanate, of at least one alkanolamine having at least one hydroxyl group, at least one amino group and a molecular weight of from 47 up to 2000 as well.

Examples of proper alkanolamines are: N(2-hydroxyethyl)1.2-diaminoethane, 2-dimethylaminoethanol, mono-, di- and tri-isopropanolamine, mono-, di- and tri-ethanolamine, tris(hydroxy methyl)aminomethane, 2-amino-2-methyl 1.3-propanediol, 1-amino 2-propanol, 2-[2-aminoethylamino)ethylamino]ethanol, 2-amino 2-methyl-1-propanol, 3-amino-1.2-propanediol, 1.3-bis(-hydroxymethyl)urea, 6-amino-1-hexanol, N-β-hydroxyethyl morpholine, 1.2-diamino-N-[3-hydroxyethyl]-propane, N-[3-aminopropyl]diethanolamine, 1.3-bis(-dimethylamino) 2-propanol, 2-hydroxyethyl hydrazine and mixtures thereof. Triethanolamine is the most preferred alkanolamine. The proportion to be added amounts preferably from 2 to 7 parts by weight per 100 parts by weight of polyisocyanate.

Although in principle all organic polyisocyanates may be used for the present process, 4.4'-diphenylmethanediisocyanate is preferred.

Water may be added in a proportion equivalent to the isocyanate, but preferably a stoechiometrical excess of 1.5 to 10 is used.

Secondary and tertiary amines, organometal compounds, hexahydrotriazines, imidazoles and pyrroles may be used as a catalyst. Due to the addition of surfactants emulsification, foam stabilization and contact between the polyisocyanate and water to be promoted. For example anionic, cationic or non-ionic oils or mixtures of said products may be used as surfactants.

In order to improve the reaction profile still further cocatalysts may be used, for example inorganic salts of metals, that are able to foam complexes with the amines, for example, chlorides, nitrates and sulphates of nickel, cobalt, iron, copper and silver.

Figure 1:
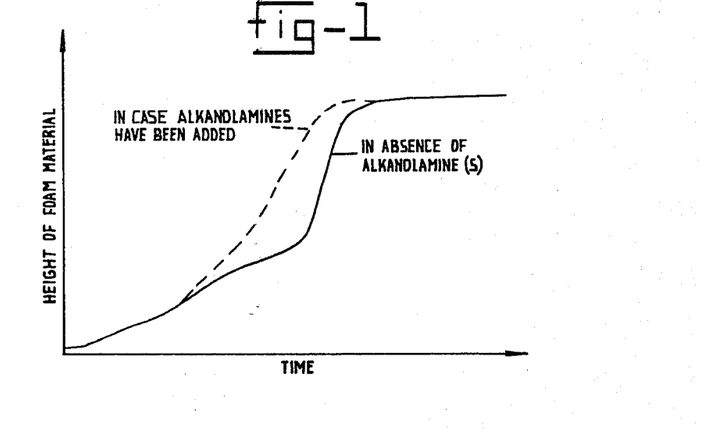
FIG. 1 is a graph illustrating height of foam vs. time with and without alkanolamines.

Reaction mixtures according to the invention provide foam materials having more open cells, a lower shrinkage, a smaller number of cavities and a rise profile that has an improved slope as well (See FIG. 1).

Figure 2:
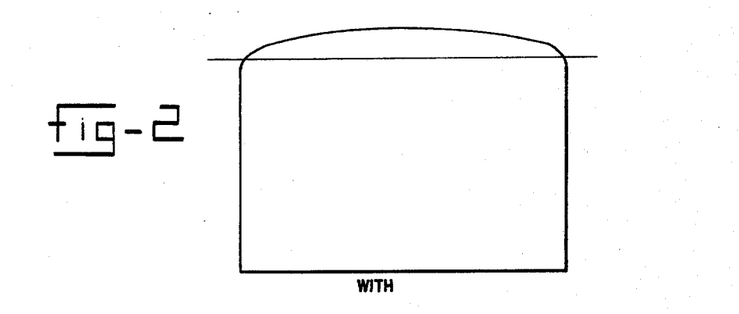
FIG. 2 is a profile of foam materials prepared with a floating lid.
Figure 3:
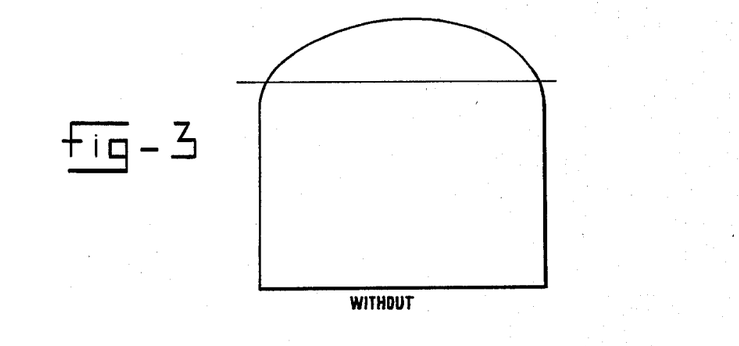
FIG. 3 is a profile of foam material prepared without a floating lid.

In case alkanolamines are used the more or less typically highly bent upper surface, that causes a poor cut up yield may be flattened considerably, due to which an improved cut up yield may be achieved. Preferably a floating lid is applied upon the blocks before the reaction has been completed; then the foam material is formed under a somewhat increased pressure (See FIGS. 2 and 3, which indicate respectively the profile of foam materials prepared with and without, respectively a floating lid). In order to increase the toughness of the polyurea foam material, extenders may be incorporated in the recipe. As "extenders" may be used chemical materials having a molecular weight of from 62 to 2000, preferably of from 62 to 1000, that contain at least 2 hydroxyl groups. Examples of such extenders are ethylene glycol, diethylene glycol, propylene glycol, dipropylene glycol, butanediol, hexanediol, polypropylene oxide, polyethylene oxide or mixtures thereof. The concentration of said materials may be within the range of from 2 to 20 parts by weight, preferably from 5 to 15 parts by weight, per 100 parts by weight of polyisocyanate. Since said materials increase the toughness of the polyurea foam material, depending on the requirement of the final product, it is possible to omit one or more treatments (for example crushing, application of a plastic foil).

It is also possible to increase the toughness of the polyurea foam material by substituting a part of the polyisocyanate by a modified 4.4'-diphenylmethane diisocyanate, for example prepolymers and dimers of carbodiimides. Also mixtures of said products may be used. The degree of substitution amounts from 1 to 60 percent, preferably from 5 to 20 percent, calculated on the amount of nonpurified 4.4'-diphenylmethane diisocyanate. As examples may be mentioned Desmodur PF of Bayer, Daltoped 400PPA of ICI and Isonate 1432 of Upjohn.

The foamed material should be cut into pieces. Preferably this may be performed by cutting the foam material in the rise direction of the foam material. More particularly by cutting in the rise direction that is perpendicularly to the machine direction of the foam. See FIG. 4 wherein "A" indicates the rise direction of the foam, "B" indicates the machine direction and "C" indicates the preferred direction of cutting the foam material "X", the lines "D" indicate lengthwise cuts in the rise and machine direction.

The hard foam pieces obtained in this way are generally at least once compressed in a direction perpendicularly to the rise direction of the foam material and subsequently they are allowed to expand again. Said operation is indicated as "crushing". By means of "crushing" very thin cellwalls (cell membranes), spread between the cell ribs, are destroyed without damaging seriously said cell ribs. By means of said "crushing" the brittle hard foam piece is converted into a semihard, elastic, flexible piece.

Figure 5:
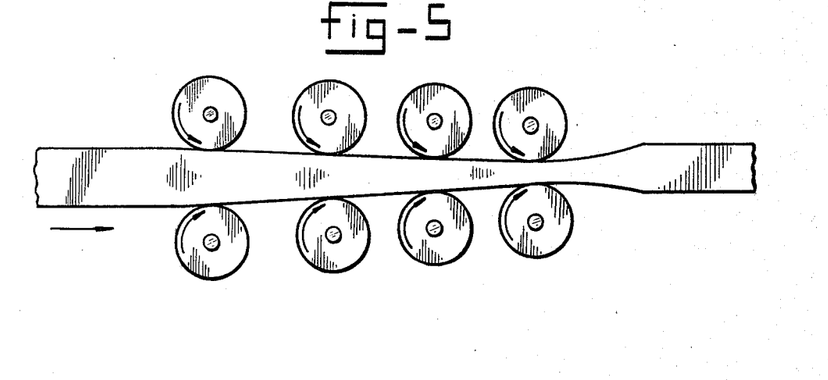
FIG. 5 is a schematic illustration of a crushing operation using a series of rolls.

In the most simple way of "crushing" the foam material is compressed systematically, for example by passing said pieces of foam material over a series of rolls having a controlled interspace, wherein the couples of rolls in the machine direction are gradually nearer to each other (See FIG. 5). Said compression is performed perpendicularly to the rise direction of the foam material, since the cells of the foam material may be considered as enlarged dodecaheders having their longitudinal axis in the rise direction of the foam. Said cell ribs have to be deformed less by said way of compression to promote destruction of the cell walls, than in case said pieces would be compressed in an other direction. After such a "crushing" treatment the retaining deformation amounts up to 20 percent.

Crushing of pieces having a thickness of more than 5 cm is preferably performed by means of a pneumatic method. In that case the pieces are introduced in a space wherein the gas pressure is changed cyclically, for example by vacuumizing and subsequently recovering the barometric pressure or by introducing a gas followed by adjustment of the normal air pressure. Said variations in gas pressure cause a destruction of the cell membranes in case the pressure differences are sufficiently large and the cyclus periods of the cycli are sufficiently short.

A combination of a pneumatic and a mechanic crushing is particularly proper for thicker pieces or for a pile of pieces. In that case the piece or the pile of pieces is applied between two hard plates (metal or wood) (See FIG. 6) and then it is applied in a gastight flexible envelope (for example a bag of a plastic film) and the pressure is increased and decresed cyclically, respectively decreased and increased (vide FIG. 6, wherein "D" stands for a wooden plate, "E" a bag of a plastic film. "F" a hinge "G" pieces of polyurea foam material).

Figure 6:
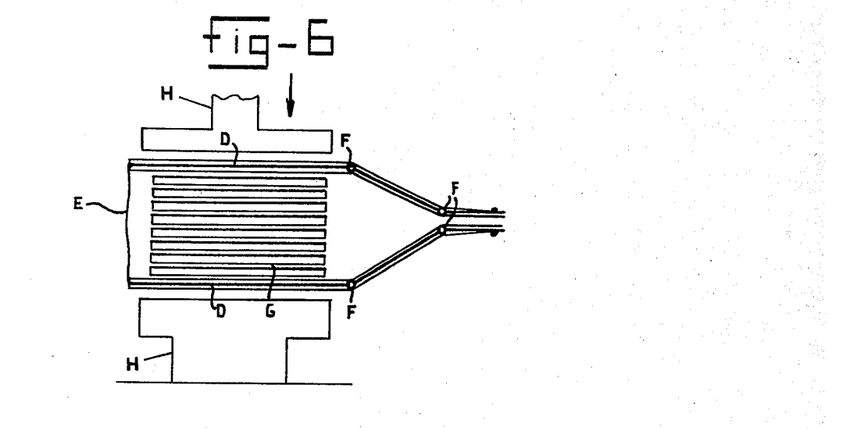
FIG. 6 is schematic illustration of a pneumatic system for crushing a pile of pieces.

According to such a process cell membranes are not broken only by the gases (air) introduced and removed but are also compressed mechanically by means of two rigid plates between which the foam material is compressed. Mechanical pressure may be applied by inserting in a press H and pressing plates "D" toward one another.

A further perfection of said brittle hard foam pieces consists of coating at least one side. This may be carried out by adhering paper or a plastic film on said pieces of foam material. Due to the small weight by volume of the foam material it is difficult, or even impossible, to achieve a good adhesion.

Figure 7:
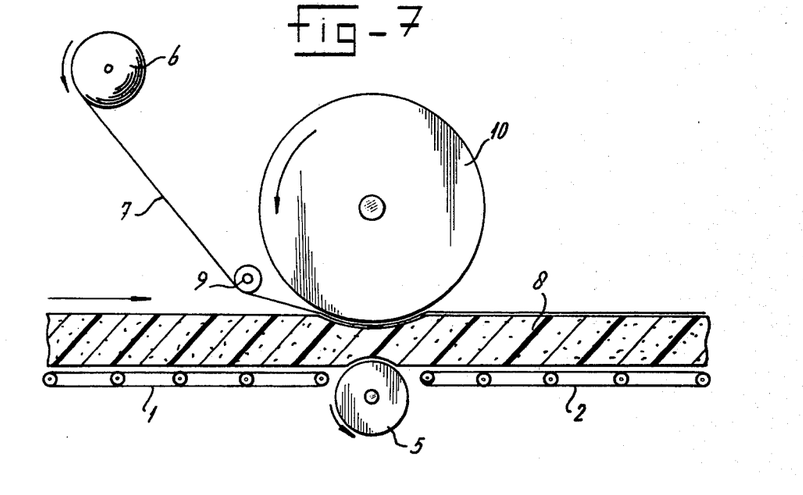
FIG. 7 is a schematic illustration of a system for applying a plastic film to the surface of a polyurea foam slab.

According to a very special technique a plastic film provided on one side with a thin thermoplastic layer is applied by means of one or two rolls at a temperature of about 300° C. on a foam material piece by means of calandering. See FIG. 7 wherein:

1 and 2 stand for conveyor belts, used to convey a polyurea foam mass 8,
3 and 4 are rolls over which the conveyor belts 1 and 2 may be moved,
5 is a pressure roll for application of the foam material,
6 is a supply roll for the plastic film,
7 is a plastic film provided with a thin thermoplastic layer,
8 is a polyurea foam mass,
9 is a slide roll for the plastic film and
10 is a heated roll.

By means of said technique a thin plastic film may be applied at a high speed (up to 30 m/Min) on the surface of the foam material without using an adhesive.

In said way also a laminate may be manufactured having a mechanical strength that is sufficient to be applied on a commercial scale. Said water proof plastic film avoids penetratin of water.

The foam material pieces provided with said film may be crushed after the application of said plastic film, if desired.

Although, in principle all plasticizers for polyurethane may be used, preferably phosphated and/or halogenated products are used, since said products improve also the fire preventing action of said polyurea foam material.

The amounts of plasticizer may be in the range from 5 to 60 parts by weight per 100 parts by weight of polyisocyanate. If they are free of active hydrogen, they may be added directly to the polyisocyanate.

Apart from the manufacture of foam material pieces from foam material blocks, such pieces may be manufactured also directly, by using an adapted catalyst system, according to the so-called double belt system. In case the known catalyst systems are used in said system for the preparation of polyurea foam materials cavities and pits are formed in the foam pieces. If the process according to the invention is used, that means by using alkanol amines, said defects may be avoided also.

Figure 8:
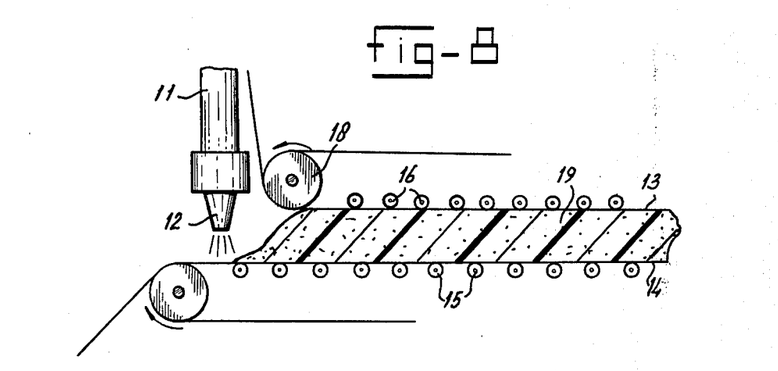
FIG. 8 is a schematic illustration of a system for applying a film to two opposite surfaces of a slab of polyurea as it is being formed in a machine.

In case the double belt system is used in the reaction products are sprayed on a moving conveyor belt on which a film has been applied. Instead of allowing a free rising of the foam material a second film may be applied (See FIG. 8) before the foam has risen completely, if the desired thickness of the pieces has been achieved. In FIG. 8

11 means a mixing space of a spraying device for spraying polyurea foam material components;
12 is a nozzle of a spraying device;
13 is the upper conveyor film;
14 is the lower conveyor film;
15 are rollers over which the lower conveyor film may be moved;
16 are rollers over which the upper conveyor film may be moved;
17 is a driving roller for the lower conveyor film;
18 is a driving roller for the upper conveyor film and
19 is polyurea foam material.

The upper film is moved as fast as the lower film, and is pressed downwardly continuously at the same distance until the foam has been reacted completely. The films remain on the pieces. The polyurea foam prepared according to said method has a higher density (net ± 15 kg/m³), but in this case the subsequent application of films and cutting of the blocks into pieces is superfluous.

EXAMPLE I

Components

| A mixture from: | non-purified 4.4'-diphenylmethanediisocyanate | 100 parts by weight |
|---|---|---|
| | tris(2.3-dichloropropyl) phosphate and | 20 parts by weight |
| a mixture of: | L6502 (Union Carbide) | 1 part by weight |
| | water | 35 parts by weight |
| | bis-(2-dimethylaminoethyl) ether | 4 parts by weight |
| | diethanolamine | 3 parts by weight |
| Machine conditions (high-pressure spraying machine) | | |
| amount of isocomponent: | 9.62 kg/min (low pressure) | |
| amount of activator component: | 2.89 kg/min (high pressure) ± 60 kg/cm²) | |
| stirring speed: | 1000 revolutions/min | |
| belt speed: | 2.7 m/min | |
| total foam distance: | 3.0 meter | |
| slope of conveyor belt: | 3° | |
| block width: | 120 cm | |
| block height: | 72 cm | |
| The gross density of the blocks amounted 4.3 kg/m³. | | |

Figure 4:
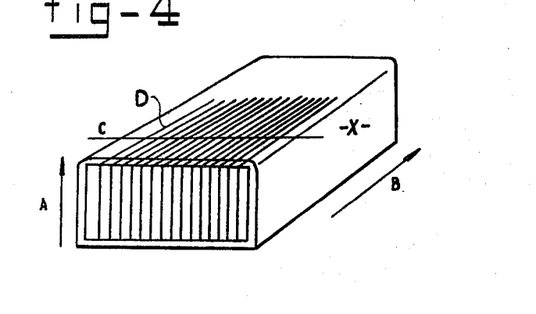
FIG. 4 is an isometric view of a slab of polyurea indicating the manner of cutting according to this invention.

The foam material blocks were sawn in the direction indicated in FIG. 4 into pieces having a thickness of 2.5 cm. Subsequently said pieces were crushed between 3×2 rolls, wherein the distance between the couples of rolls was respectively 20 mm, 10 mm and 5 mm. The pieces remained straight after the crushing operation. The recovery of thickness amounted 95 percent. As a test some pieces were sawn in a direction perpendicular to the rise direction and subsequently they were crushed. The recovery was poorer than in case the crushing had been carried out in the correct direction. The recovery amounted just 70 percent.

Figure 9:
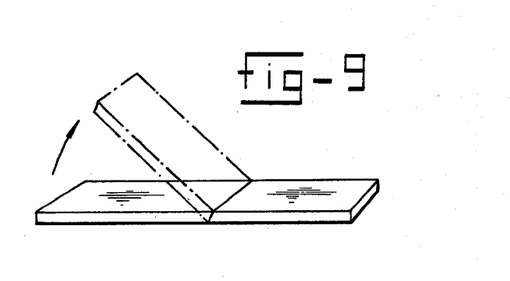
FIG. 9 is a schematic illustration of a method of measuring flexibility.
Figure 10:
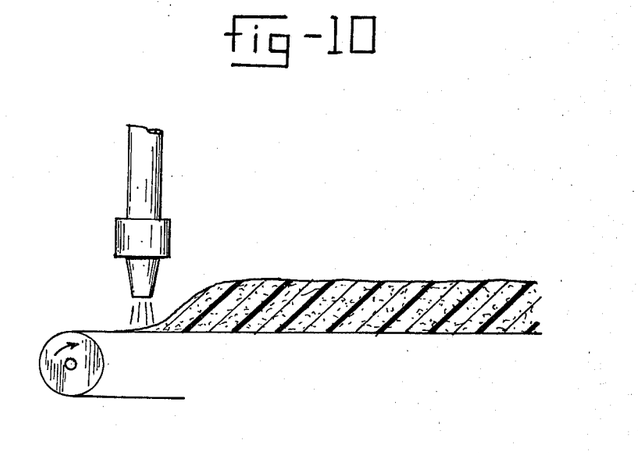
FIG. 10 is a schematic illustration of the rise and formation of the foam of this invention.

From the poor recovery it appears how important it is to crush in the direction parallel to the rise direction of the foam material. Some pieces were not crushed and the difference in flexibility in comparison with the crushed pieces was determined and has been indicated in FIG. 9.

The pieces were bent and the angle at which the foam material teared was registered.

Said angle amounted for non-crushed sheets as an average 85° (average of 10 measurements standard deviation ± 15°).

All crushed sheets could be bent up to 180°.

EXAMPLE II

Components

| A mixture of: | non-purified 4.4'-diphenylmethanediisocyanate | 100 parts by weight |
|---|---|---|
| | tris(2.3-dibromopropyl) phosphate and | 30 parts by weight |
| a mixute of: | water | 45 parts by weight |
| | OS15 (Bayer) | 0.6 parts by weight |
| | dimethylcyclohexylamine | 4 parts by weight |
| | diisopropanolamine | 7 parts by weight |
| Machine conditions (low pressure spraying machine) | | |
| amount of isocomponent: | 16.35 kg/min | |
| amount of activator component: | 7.17 kg/min | |
| stirring speed: | 3000 revolutions/min | |
| belt speed: | 2.6 m/min | |
| total foam distance: | 3.0 m | |
| air: | 2 l/min | |
| slope of the conveyor belt: | 3° | |
| block width: | 124 cm | |
| block height: | 94 cm | |
| The gross density amounted 5.8 kg/m³. | | |

The blocks were, just like in example I sawn into pieces. However, the thickness of the pieces was now 5 cm. The difference in flexibility between crushed and non-crushed pieces was determined by means of the same test as disclosed in example I. The crushed pieces teared averagely at 160° (± 20°) (some could be bent up to 180°). For the non-crushed sheets the angle amounted just 68° (all averages of 10 measurements).

EXAMPLE III

Components

| A mixture of: | non-purified 4.4'-diphenylmethanediisocyanate | 100 parts by weight |
|---|---|---|
| | tris(β chloroethyl)phosphate and | 65 parts by weight |
| a mixture of: | water | 40 parts by weight |
| | B1048 (Goldschmidt) | 1 part by weight |
| | 2.4.6-tris(N.N-dimethyl aminomethyl)phenol | 5 parts by weight |
| | monoethanolamine | 3 parts by weight |

Machine conditions

Just like in example I, but
the amount of isocomponent amounted: 25.45 kg/min
the amount of activator component amounted: 7.55 kg/min
block height: 65 cm
belt speed: 2.4 m/min
The gross weight by volume of said foam materials amounted 14.1 kg/m³.

The blocks were sawn into pieces having a thickness of 2.5 and 5 cm. Some pieces of each type were crushed. Some pieces were coated at two sides with a thermoplastic film, consisting of a layer of a copolymer of ethylene and acrylic acid, that melted at a temperature of 300° C., on a film that melts at a temperature above 300° C., having a total thickness of 25 microns. The bend tests of example I were repeated with pieces coated with said plastic film. The pieces having a thickness of 2,5 cm as well as the pieces having a thickness of 5 cm could be bent over an angle of 180° without tearing, independent of the fact whether they had been crushed or had not been crushed.

EXAMPLE IV

Components

| | | |
|---|---|---|
| A mixture of: | non-purified 4.4'-diphenylmethanediisocyanate | 100 parts by weight |
| | tetrakis(2-chloroethyl) ethylenediphosphate and | 50 parts by weight |
| a mixture of: | water | 30 parts by weight |
| | L5320 (Union Carbide) | 2 parts by weight |
| | 2-methylimidazole | 1.2 parts by weight |
| | triethanolamine | 5 parts by weight |

Machine conditions

As mentioned in example II, but
the amount of isocomponent was 25.3 kg/min
the amount of activator component amounted 11.1 kg/min
The gross density of the foam material amounted 9.6 kg/m$^3$.

By way of trial in the first part of the belt the triethanolamine had been omitted. The result was that the blocks at the lower side showed considerable cavities.

From the part of the foam material on which triethanolamine had been sprayed, pieces were sawn according to the indications stated in example I. The thickness of said pieces amounted 5 cm. Some pieces were crushed, other pieces were not crushed and still other pieces were crushed and coated with a foil as disclosed in example III. The pieces were compressed with a ball having a diameter of 2.53 cm. There was registered at what percentage of compression the foam teared (compressing speed 10 mm/min). The non-crushed pieces tore at a compression of 36 percent. The crushed sheets and the foil coated sheets did not tear after a maximum compression of 90 percent.

EXAMPLE V

| | | |
|---|---|---|
| A mixture of: | non-purified 4.4'diphenylmethanediisocyanate | 100 parts by weight |
| | tris(2.3-dibromopropyl) phosphate | 40 parts by weight |
| | LK 221 (Air Products) and | 2.5 parts by weight |
| a mixture of: | water | 25 parts by weight |
| | DBU | 5 parts by weight |
| | N.N-dimethylethanolamine | 5 parts by weight |

Machine conditions

Vide example I, but
the amount of isocomponent was 14.7 kg/min
the amount of activator component amounted 4.42 kg/min The gross weight by volume of said foam amounted 6.5 kg/m$^3$.

The foam was sawn under the conditions stated in example I. A part of said sawn pieces was crushed. The crushed pieces and the non-crushed pieces were subjected to some tests for physical properties. At other series of crushed and non-crushed pieces was subjected to ageing tests, and subsequently the physical properties were determined again. In tables A and B the results of said measurements have been summarized.

TABLE A

NON-CRUSHED POLYUREA FOAM

| Test | | Specification | Unit | Blank | After streaming autoclave (ISO 2440) | After dry heating (ISO 2440) | After aging in wet air (ISO 2440) | After 24 h dry freezing (internal test) |
|---|---|---|---|---|---|---|---|---|
| RG | | ISO 1855 | kg/m$^3$ | 6.5 | 7.1 | 6.5 | 6.45 | 6.5 |
| CDH | 25 | ISO-DIS 3386 | KPa | 5.40 | 6.65 | 9.15 | 7.2 | 5.20 |
| | 40 | | | 5.60 | 7.10 | 9.25 | 7.6 | 5.15 |
| | 65 | | | 9.00 | 12.15 | 18.01 | 12.7 | 8.90 |
| | recovery | | | 13.4 | 7.5 | 17.40 | 10.9 | 12.20 |
| ER | | ISO 1798 | % | 16.0 | 11.0 | 9.4 | 14 | 16.0 |
| RR | | | KPa | 38.2 | 27.0 | 25.3 | 48.4 | 40.0 |
| Brittleness | 2' | ASTM-C-421 | loss in | 0 | 2.8 | 1.1 | 0.8 | +0.1 |
| | 10' | | % | 4.4 | destruction | 16.9 | 15.1 | 2.3 |
| LOI | | ASTM D-2863-74 | % O$_2$ | 26 | 26 | 24 | 25 | 26 |
| French radiation test | | NF 92-501 | | M2 | M2 | M2 | M2 | M2 |
| Stability +95° | 1 | internal method | % | −0.9 | +0.2 | −0.3 | −0.3 | −0.3 |
| | b | | | −0.8 | +0.3 | −0.2 | −0.3 | −0.6 |
| | d | | | −0.6 | +0.6 | −0.3 | −0.3 | +0.3 |
| −30° | 1 | | | −0.1 | +0.2 | +0.3 | +0.05 | +0.1 |
| | b | | | −0.2 | +1.9 | +0.5 | −0.1 | +0.05 |
| | d | | | −0.3 | +0.3 | +0.3 | +0 | +0.3 |
| Thermal conduction coefficient λ | | Guarded hot plate ASTM C177 | W/hm2° C. | 0.0504 | 0.0483 | 0.0490 | 0.0470 | 0.0478 |

RG = weight by volume
CDH = compression hardness
ER = extension at break
RR = elongation at break
LOI = limit oxygen index

TABLE B

NON-CRUSHED POLYUREA FOAM

| Test | | Specification | Unit | Blank | After streaming autoclave (ISO 2440) | After dry heating (ISO 2440) | After aging in wet air (ISO 2440) | After 24 h dry freezing (internal test) |
|---|---|---|---|---|---|---|---|---|
| RG | | ISO 1855 | kg/m$^3$ | 6.9 | 7.0 | 6.7 | | 6.9 |
| CDH | 25 | ISO-DIS 3386 | KPa | 4.22 | 6.65 | 8.15 | 6.00 | 4.16 |
| | 40 | | | 4.64 | 7.20 | 8.65 | 6.50 | 4.58 |

TABLE B-continued
NON-CRUSHED POLYUREA FOAM

| Test | Specification | Unit | Blank | After streaming autoclave (ISO 2440) | After dry heating (ISO 2440) | After aging in wet air (ISO 2440) | After 24 h dry freezing (internal test) |
|---|---|---|---|---|---|---|---|
| 65 |  |  | 8.38 | 12.60 | 16.00 | 11.56 | 8.34 |
| recovery | ISO 1798 | % | 5.1 | 5.6 | 5.2 | 5.3 | 4.2 |
| ER |  | % | 10 | 3.0 | 2.0 | 10 | 14 |
| RR |  | KPa | 36 | 24.9 | 24.4 | 29.6 | 38.7 |
| Brittleness 2' | ASTM-C-421 | loss in | 0.5 | 3.4 | 2.0 | 1.6 | 0.2 |
| 10' | 6, | % | 6.7 | destruction | 19.3 | 26.9 | 5.6 |
| LOI | ASTM D-2863-74 | % $O_2$ | 26 | 26 | 24 | 25 | 26 |
| French radiation test | NF 92-501 |  | M2 | M2 | M2 | M2 | M2 |
| Stability +95° 1 | internal | % | −1.2 | −0.5 | −0.4 | +0.5 | −0.1 |
| b | method |  | −0.9 | +0.1 | −0.2 | −0.3 | −0.7 |
| d |  |  | +2.5 | +0.6 | −0.6 | −2.4 | +1.2 |
| −30° 1 |  |  | +0.05 | +0.5 | −0.1 | −0.05 | −0.05 |
| b |  |  | +0.2 | ±0 | +0.1 | +0,8 | −0.05 |
| d |  |  | +0.3 | −0.3 | −0.3 | +0.3 | −1.2 |
| Thermal conduction coefficient λ | Guarded hot plate ASTM C177 | W/hm2° C. | 0.0487 | 0.0456 | 0.0457 | 0.0495 | 0.0485 |

RG = weight by volume
CDH = compression hardness
ER = extension at break
RR = elongation at break
LOI = limit oxygen index

I claim:

1. A method of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with an increased slope as compared with conventional polyurea foams.

2. A method of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with a uniform increased slope as compared with conventional polyurea foams and characterized in using triethanolamine as said alkanolamine.

3. A method according to claim 1 or 2 characterized in incorporating 2 to 7 parts by weight of alkanolamine per 100 parts by weight of polyisocyanate.

4. A method according to claims 1 or 2 characterized in incorporating in said reaction mixture also at least one cocatalyst inorganic metal salt, that is able to form complexes with alkanolamines.

5. A method according to claims 1 or 2 characterized in keeping the height of the foam block flat and smooth by passing the freshly formed foam beneath a floating lid.

6. A method according to claims 1 or 2 characterized in dividing the foam material into pieces by cutting it in the rise direction transverse to the machine direction of the foam material.

7. A method according to claim 6 characterized in compressing said cured pieces at least once perpendicularly to the rise direction and subsequently leaving it to expand whereby said pieces are made flexible by rupturing a portion of the cell walls.

8. A method according to claim 6 characterized in compressing said cured foam pieces perpendicularly to the rise direction and subsequently expanding it by passing said piece through a series of rolls having controlled interspaces, at which the couples of rolls are gradually nearer to each other in the conveying direction whereby said pieces are made flexible by rupturing a portion of the cell walls.

9. A method according to claim 6 characterized in compressing said cured foam pieces perpendicularly to the rise direction and subsequently leaving to expand under a reduced pressure and removing the reduced pressure suddenly whereby said pieces are made flexible by rupturing a portion of the cell walls.

10. A method according to claim 6 characterized in subjecting said cured foam pieces to an increased pressure and removing suddenly said increased pressure, so that they may expand in one direction perpendicularly to the rise direction whereby said pieces are made flexible by rupturing a portion of the cell walls.

11. A process according to claim 6 characterized in coating at least one surface of a foam piece with a film.

12. A method according to claim 11 characterized in using a plastic film that has a thermoplastic layer and applying it at an increased temperature with the thermoplastic layer on said foam material whereby the film is adhered to the foam material.

13. A method according to claim 11 characterized in compressing a cured foam piece coated with a film, at least once perpendicularly to the rise direction and subsequently leaving it to expand whereby said pieces are made flexible by rupturing a portion of the cell walls.

14. A method according to claim 3 characterized in incorporating in said reaction mixture also at least one cocatalyst inorganic metal salt, that is able to form complexes with alkanolamines.

15. A method according to claim 3 characterized in keeping the height of the foam block flat and smooth by passing the freshly formed foam beneath a floating lid.

16. A method according to claim 4 characterized in keeping the height of the foam block flat and smooth by passing the freshly foamed foam beneath a floating lid.

17. A method according to claim 3 characterized in dividing the foam material into pieces by cutting it in the rise direction transverse to the machine direction of the foam material.

18. A method according to claim 4 characterized by dividing the foam material into pieces by cutting it in the rise direction transverse to the machine direction of the foam material.

19. A method according to claim 5 characterized in dividing the foam material into pieces by cutting it in the rise direction transverse to the machine direction of the foam material.

20. A method according to claim 17 characterized in compressing said cured pieces at least once perpendicularly to the rise direction and subsequently leaving it to expand whereby said pieces are made flexible by rupturing a portion of the cell walls.

21. A method according to claim 18 characterized in compressing said cured pieces at least once perpendicularly to the rise direction and subsequently leaving it to expand whereby said pieces are made flexible by rupturing a portion of the cell walls.

22. A method according to claim 19 characterized in compressing said cured pieces at least once perpendicularly to the rise direction and subsequently leaving it to expand whereby said pieces are made flexible by rupturing a portion of the cell walls.

23. A method according to claim 20 characterized in compressing said foam pieces perpendicularly to the rise direction and subsequently expanding it by passing said piece through a series of rolls having controlled interspaces, at which the couples of rolls are gradually nearer to each other in the conveying direction.

24. A method according to claim 21 characterized in compressing said foam pieces perpendicularly to the rise direction and subsequently expanding it by passing said piece through a series of rolls having controlled interspaces, at which the couples of rolls are gradually nearer to each other in the conveying direction.

25. A method according to claim 22 characterized in compressing said foam pieces perpendicularly to the rise direction and subsequently expanding it by passing said piece through a series of rolls having controlled interspaces, at which the couples of rolls are gradually nearer to each other in the conveying direction.

26. A method according to claim 20 characterized in compressing said foam pieces perpendicularly to the rise direction and subsequently leaving to expand under a reduced pressure and removing the reduced pressure suddenly.

27. A method according to claim 23 characterized in compressing said foam pieces perpendicularly to the rise direction and subsequently leaving to expand under a reduced pressure and removing the reduced pressure suddenly.

28. A method according to claim 22 characterized in compressing said foam pieces perpendicularly to the rise direction and subsequently leaving to expand under a reduced pressure and removing the reduced pressure suddenly.

29. A method according to claim 20 characterized in subjecting said foam pieces to an increased pressure and removing suddenly said increased pressure, so that they may expand in one direction perpendicularly to the rise direction.

30. A method according to claim 21 characterized in subjecting said foam pieces to an increased pressure and removing suddenly said increased pressure, so that they may expand in one direction perpendicularly to the rise direction.

31. A method according to claim 22 characterized in subjecting said foam pieces to an increased pressure and removing suddenly said increased pressure, so that they may expand in one direction perpendicularly to the rise direction.

* * * * *

UNITED STATES PATENT AND TRADEMARK OFFICE
CERTIFICATE OF CORRECTION

PATENT NO. : 4,334,944
DATED : June 15, 1982
INVENTOR(S) : HUBERT S. CREYF

It is certified that error appears in the above-identified patent and that said Letters Patent are hereby corrected as shown below:

Column 1, line 28, "wheein at lest" should read --wherein at least--.

Column 1, line 38, "thea bove" should read --the above--.

Column 2, line 11, "to" should be --may--.

Column 2, line 16, "foam" should be --form--.

Column 4, line 39, "penetratin" should be --penetration--.

Column 4, line 62, "in" should be deleted.

Column 8, line 28, "At" should be --An--.

Claim 16, column 11, line 3, "foamed" should be --formed--.

Claim 27, column 12, line 14, "claim 23" should be --claim 21--.

Signed and Sealed this

Fifth Day of October 1982

[SEAL]

Attest:

GERALD J. MOSSINGHOFF

Attesting Officer

Commissioner of Patents and Trademarks

REEXAMINATION CERTIFICATE (344th)
United States Patent [19]
Creyf

[11] B1 4,334,944
[45] Certificate Issued Apr. 30, 1985

[54] METHOD OF PREPARING POLYUREA FOAM MATERIALS

[75] Inventor: Hubert S. Creyf, Brugge, Belgium

[73] Assignee: PRB N.V., Brussels, Belgium

Reexamination Request:
No. 90/000,456, Oct. 7, 1983

Reexamination Certificate for:
Patent No.: 4,334,944
Issued: Jun. 15, 1982
Appl. No.: 36,452
Filed: May 7, 1979

Certificate of Correction issued Oct. 5, 1982.

[30] Foreign Application Priority Data

May 8, 1978 [NL] Netherlands ............ 7804908

[51] Int. Cl.³ .................. B29D 27/04; B32B 5/18
[52] U.S. Cl. .................. 156/308.2; 264/54; 264/145; 264/321; 264/DIG. 4; 521/106; 521/129; 521/164
[58] Field of Search ............ 264/54, 51, 146, 145

[56] References Cited

U.S. PATENT DOCUMENTS

| | | | |
|---|---|---|---|
| 2,841,205 | 7/1958 | Bird | 264/146 X |
| 3,006,033 | 10/1961 | Knox | 264/54 X |
| 3,056,168 | 10/1962 | Terry | 264/54 X |
| 4,087,389 | 5/1978 | Coppola | 521/159 |
| 4,105,594 | 8/1978 | Dieterich et al. | 521/100 |
| 4,234,693 | 11/1980 | Wooler | 521/107 |

FOREIGN PATENT DOCUMENTS

| | | | |
|---|---|---|---|
| 866233 | 3/1971 | Canada | |
| 50-6863 | 3/1975 | Japan | 264/145 |
| 892776 | 3/1962 | United Kingdom | |

OTHER PUBLICATIONS

*British Plastics*, vol. 34, No. 4, "New Polyether Foam Plant", Apr. 1961, p. 195.
Borsus et al, Journal of Applied Polymer Science, vol. 26, pp. 3027–3043 (1981).
H. Creyf Commission of the European Communities 1980, EUR 6737 EN. [cf. Chemical Abstracts 93, 187078S, 1980].

*Primary Examiner*—Philip Anderson
*Attorney, Agent, or Firm*—Eugene F. Buell

[57] ABSTRACT

The present invention provides a method to improve the rupture stability of polyurea foam materials to such a level that they can be applied on a commercial scale. This is achieved by incorporating 0.5 to 50 parts by weight of at least one alkanolamine having at least one amino group, one hydroxyl group and a molecular weight of from 47 to 2000 per 100 parts by weight of polyisocyanate used for the preparation of said polyurea foam materials. Preferably the foam material prepared is cut into pieces by cutting it in the rise direction, more particularly in the rise direction that is perpendicular to the machine direction of the foam, and subsequently crushing said pieces at least once.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-3, 6, 17, and 19 is confirmed.

Claims 5 and 15 are cancelled.

Claims 4, 7-14, 18, 20, 22, 23, 25, 26, 28, 29 and 31 are determined to be patentable as amended.

Claims 16, 21, 24, 27 and 30, dependent on an amended claim, are determined to be patentable.

New claims 32-42 are added and determined to be patentable.

4. *A method* [according to claim 1 or 2] *of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with an increased slope as compared with conventional polyurea foams and* characterized in incorporating in said reaction mixture also at least one cocatalyst inorganic metal salt, that is able to form complexes with alkanolamines.

7. A method [according to claim 6 characterized] *of preparing polyurea foam materials, comprising reacting in the presence of at least one catalyst, at least one polyisocyanate with water, 0.5 to 50 parts by weight of at least one plasticizer per 100 parts by weight of polyisocynate, 0.5 to 50 parts by weight, per 100 parts by weight of polyisocynate, of at least one alkanolamine having a molecular weight of from 47 up to 2000, and having at least one hydroxyl group and at least one amine group to form a foam material and solidifying the foam as a semi-rigid polyurea foamed product characterized by a rise profile with an increased slope as compared with conventional polyurea foams and characterized in dividing the foam material into pieces by cutting it in the rise direction transverse to the machine direction of the foam material and* in compressing said cured pieces at least once perpendicularly to the rise direction and subsequently leaving it to expand whereby said pieces are made flexible by rupturing a portion of the cell walls.

8. A method [according to claim 6 characterized] *of preparing polyurea foam materials, comprising reacting in the presence of at least one catalyst, at least one polyisocynate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with an increased slope as compared with conventional polyurea foams and characterized in dividing the foam material into pieces by cutting it in the rise direction transverse to the machine direction of the foam material and* in compressing said cured foam pieces perpendicularly to the rise direction and subsequently expanding it by passing said piece through a series of rolls having controlled interspaces, at which the couples of rolls are gradually nearer to each other in the conveying direction whereby said pieces are made flexible by ruputuring a portion of the cell walls.

9. A method [according to claim 6 characterized] *of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with an increased slope as compared with conventional polyurea foams and characterized in dividing the foam material into pieces by cutting it in the rise direction transverse to the machine direction of the foam material and* in compressing said cured foam pieces of perpendicularly to the rise direction and subsequently leaving to expand under a reduced pressure and removing the reduced pressure suddenly whereby said pieces are made flexible by rupturing a portion of the cell walls.

10. A method [according to claim 6 characterized] *of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with an increased slope as compared with conventional polyurea foams and characterized in dividing the foam material into pieces by cutting it in the rise direction transverse to the machine direction of the foam material and* in subjecting said cured foam pieces to an increased pressure and removing suddenly said increased pressure, so that they may expand in one direction perpendicularly to the rise direction whereby said pieces are made flexible by rupturing a portion of the cell walls.

11. A method [according to claim 6 characterized] *of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight per 100 parts by weight of polyisocyanate, 0.5 to 50 parts by weight per 100 parts by weight of polyisocyanate, of at least one alkanolamine having a molecular weight of from 47 up to 2000, and having at least one hydroxyl group and at least one amine group to*

*form a foam material and solidifying the foam as a semi-rigid polyurea foamed product characterized by a rise profile with an increased slope as compared with conventional polyurea foams and characterized in dividing the foam material into pieces by cutting it in the rise direction transverse to the machine direction of the foam material and* in coating at least one surface of a foam piece with a film.

12. A method according to claim 11 or 37 characterized in using a plastic film that has a thermoplastic layer and applying it at an increased temperature with the thermoplastic layer on said foam material whereby the film is adhered to the foam material.

13. A method according to claim 11 or 37 characterized in compressing a cured foam piece coated with a film, at least once perpendicularly to the rise direction and subsequently leaving it to expand whereby said pieces are made flexible by rupturing a portion of the cell walls.

14. A method [according to claim 3 characterized] *of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with an increased slope as compared with conventional polyurea foams and characterized in incorporating 2 to 7 parts by weight of alkanolamine per 100 parts by weight of polyisocyanate and* in incorporating in said reaction mixture also at least cocatalyst inorganic metal salt, that is able to form complexes with alkanolamines.

18. A method according to claim 4 or 32 characterized by dividing the foam material into pieces by cutting it in the rise direction transverse to the machine direction of the foam material.

20. A method [according to claim 3 characterized] *of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with an increased slope as compared with conventional polyurea foams and characterized in incorporating 2 to 7 parts by weight of alkanolmaine per 100 parts by weight of polyisocyanate and characterized in dividing the foam material into pieces by cutting it in the rise direction transverse to the machine direction of the foam material and* in compressing said cured pieces at least once perpendicularly to the rise direction and subsequently leaving it to expand whereby said pieces are made flexible by rupturing a portion of the cell walls.

22. A method [according to claim 19 characterized] *of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with an increased slope as compared with conventional polyurea foams and* in keeping the height of the foam block flat and smooth by passing the freshly formed foam beneath a floating lid in dividing the foam material into pieces by cutting it in the rise direction transverse to the machine direction of the foam material and in compressing said cured pieces at least once perpendicularly to the rise direction and subsequently leaving it to expand whereby said pieces are made flexible by rupturing a portion of the cell walls.

23. A method according to claim 20 or 39 characterized in compressing said foam pieces perpendicularly to the rise direction and subsequently expanding it by passing said piece through a series of rolls having controlled interspaces, at which the couples of rolls are gradually nearer to each other in the conveying direction.

25. A method according to claim 22 or 40 characterized in compressing said foam pieces perpendicularly to the rise direction and subsequently expanding it by passing said piece through a series of rolls having controlled interspaces, at which the couples of rolls are gradually nearer to each other in the conveying direction.

26. A method according to claim 20 or 39 characterized in compressing said foam pieces perpendicularly to the rise direction and subsequently leaving to expand under a reduced pressure and removing the reduced pressure suddenly.

28. A method according to claim 22 or 40 characterized in compressing said foam pieces perpendicularly to the rise direction and subsequently leaving to expand under a reduced pressure and removing the reduced pressure suddenly.

29. A method according to claim 20 or 39 characterized in subjecting said foam pieces to an increased pressure and removing suddenly said increased pressure, so that they may expand in one direction perpendicularly to the rise direction.

31. A method according to claim 22 or 40 characterized in subjecting said foam pieces to an increased pressure and removing suddenly said increased pressure, so that they may expand in one direction perpendicularly to the rise direction.

32. *A method of preparing polyurea foam materials comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with a uniform increased slope as compared with conventional polyurea foams and characterized in using triethanolamine as said alkanolamine and characterized in incorporating in said reaction mixture also at least one cocatalyst inorganic metal salt, that is able to form complexes with alkanolamines.*

33. *A method of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine* having a molecular weight of from 47 up to 2000, and having at least one hydroxyl group and at least one amine group to form a foam material and solidifying the foam as a semi-rigid polyurea foamed product characterized by a rise profile with a uniform increased slope as compared with conventional polyurea foams and characterized in using triethanolamine as said alkanolamine and characterized in dividing the foam material into pieces by cutting it in the rise direction transverse to the machine direction of the foam material and in compressing said cured pieces at least once perpendicularly to the rise direction and subsequently leaving it to expand whereby said pieces are made flexible by rupturing a portion of the cell walls.

34. A method of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with a uniform increased slope as compared with conventional polyurea foams and characterized in using triethanolamine as said alkanolamine and characterized in dividing the foam material into pieces by cutting it in the rise direction transverse to the machine direction of the foam material and in compressing said cured foam pieces perpendicularly to the rise direction and subsequently expanding it by passing said piece through a series of rolls having controlled interspaces, at which the couples of rolls are gradually nearer to each other in the conveying direction whereby said pieces are made flexible by rupturing a portion of the cell walls.

35. A method of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with a uniform increased slope as compared with conventional polyurea foams and characterized in using triethanolamine as said alkanolamine and characterized in dividing the foam material into pieces by cutting it in the rise direction transverse to the machine direction of the foam material and in compressing said cured foam pieces perpendicularly to the rise direction and subsequently leaving to expand under a reduced pressure and removing the reduced pressure suddenly whereby said pieces are made flexible by rupturing a portion of the cell walls.

36. A method of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with a uniform increased slope as compared with conventional polyurea foams and characterized in using triethanolamine as said alkanolamine and characterized in dividing the foam material into pieces by cutting it in the rise direction transverse to the machine direction of the foam material and in subjecting said cured foam pieces to an increased pressure, and removing suddenly said increased pressure, so that they may expand in one direction perpendicularly to the rise direction whereby said pieces are made flexible by rupturing a portion of the cell walls in compressing said cured foam pieces perpendicularly to the rise direction and subsequently leaving to expand under a reduced pressure and removing the reduced pressure suddenly whereby said pieces are made flexible by rupturing a portion of the cell walls.

37. A method of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with a uniform increased slope as compared with conventional polyurea foams and characterized in using triethanolamine as said alkanolamine and characterized in dividing the foam material into pieces by cutting it in the rise direction transverse to the machine direction of the foam material and in coating at least one surface of a foam piece with film.

38. A method of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with a uniform increased slope as compared with conventional polyurea foams and characterized in using triethanolamine as said alkanolamine and characterized in incorporating 2 to 7 parts by weight of alkanolamine per 100 parts by weight of polyisocyanate and in incorporating in said reaction mixture also at least one cocatalyst inorganic metal salt, that is able to form complexes with alkanolamines.

39. A method of preparing polyurea foam materials, comprising, reacting in the presence of at least one catalyst, at least one polyisocyanate with water, 0.5 to 50 parts by weight of at least one plasticizer per 100 parts by weight of polyisocyanate, 0.5 to 50 parts by weight, per 100 parts by weight of polyisocyanate, of at least one alkanolamine having a molecular weight of from 47 up to 2000, and having at least one hydroxyl group and at least one amine group to form a foam material and solidifying the foam as a semi-rigid polyurea foamed product characterized by a rise profile with a uniform increased slope as compared with conventional polyurea foams and characterized in using triethanolamine as said alkanolamine and characterized in dividing the foam material into pieces by cutting it in the rise direction transverse to the machine direction of the foam material and in compressing said cured pieces at least once perpendicularly to the rise direction and subsequently leaving it to expand whereby said pieces are made flexible by rupturing a portion of the cell walls.

40. A method of preparing polyurea foam materials, comprising reacting in the presence of at least one catalyst, at least one polyisocyanate with water, 0.5 to 50 parts by weight of at least one plasticizer per 100 parts by weight of polyisocyanate, 0.5 to 50 parts by weight per 100 parts by weight of polyisocyanate, of at least one alkanolamine having a molecular weight of from 47 up to 2000, and having at least one hydroxyl group and at least one amine group to form a foam material and solidifying the foam as a semi-rigid polurea foamed product characterized by a rise profile with a uniform increased slope as compared with conventional polyurea foams and characterized in using triethanolamine as said alkanolamine and in keeping the height of the foam block flat and smooth by passing the freshly formed foam beneath a floating lid in dividing the foam material into pieces by cutting it in the rise direction transverse to the machine direction of the foam material and in compressing said cured pieces at least once perpendicularly to the rise direction and subsequently leaving it to expand whereby said pieces are made flexible by rupturing a portion of the cell walls.

41. A method according to claims 1 or 2 characterized in keeping the height of the foam block flat and smooth by passing the freshly formed foam beneath a floating lid.

42. A method according to claim 3 characterized in keeping the height of the foam block flat and smooth by passing the freshly formed foam beneath a floating lid.

* * * * *